United States Patent

[11] 3,608,078

| [72] | Inventors | John H. Gogerty<br>Dover;<br>William J. Houlihan, Mountain Lakes, both of N.J. |
|---|---|---|
| [21] | Appl. No. | 878,907 |
| [22] | Filed | Nov. 21, 1969 |
| [45] | Patented | Sept. 21, 1971 |
| [73] | Assignee | Sandoz-Wander, Inc.<br>Hanover, N.J. |

[54] 1-SULFAMOYLHEXAMETHYLENIMINE AS AN ANALEPTIC AGENT
4 Claims, No Drawings

[52] U.S. Cl. .................................................. 424/244
[51] Int. Cl. .................................................. A61u 27/00
[50] Field of Search .................................. 424/244

[56] References Cited
OTHER REFERENCES
Chem. Abst. 57– 12506– 12507 (1962 McManus et al.)
Journal of Med. Chem. 8(6), p. 766 (1965).

*Primary Examiner*—Stanley J. Friedman
*Attorneys*—Gerald D. Sharkin, Frederick H. Weinfeldt, Robert S. Honor, Walter F. Jewell and Richard E. Vila

ABSTRACT: 1-Sulfamoylhexamethylenimine is useful as an analeptic agent at dosages of from about 3.5 to 350 mg. i.v. in large animals.

1-SULFAMOYLHEXAMETHYLENIMINE AS AN ANALEPTIC AGENT

This invention relates to 1-sulfamoylhexamethylenimine (I). More particularly, this invention concerns use of this compound as an analeptic agent. The invention also relates to pharmaceutical compositions containing the above compound as an active ingredient thereof and to methods of using such compositions.

This compound (I) is known and may be prepared according to methods disclosed in the art. The compound is preparable from hexamethylenimine and sulfamide in inert solvent such as lower alkanol, e.g., methanol, ethanol, isopropanol, inert amines such as tertiary amines or pyridine and the like at a temperature between about 50° C. and 250° C., preferably about 55° to 125° C.

The compound (I) is useful because it possesses pharmacological activity in animals, such as mammals, may be used as analeptic agent and consequently can be employed to alleviate narcotic poisoning. This is indicated by its activity in mice administered hexobarbital (70 mg./kg./i.v.) and thereafter promptly administered the test compound (25 mg. to 75 mg./kg. i.p.) and noting the effect on hexobarbital anesthesia using a modification of the method reported by Winter (J. Pharmacol. and Exp. Therap., 94: 7, 1948).

For such usage, the compound may be administered parenterally as such or admixed with conventional pharmaceutically acceptable nontoxic carriers. It may be administered parenterally as solutions, suspensions, dispersions, emulsions, and the like, e.g., a sterile injectable aqueous suspension. The injectable compositions are formulated as known in the art and may contain appropriate dispersing or wetting agents (lecithin, polyoxyethylene stearate or polyoxyethylene sorbitan mono-oleate) and suspending agents (methyl cellulose, tragacanth or sodium alginate). Pharmaceutical compositions comprising the active material may contain about 0.35 percent to 5.0 percent of the compound (I).

The dosage of active ingredient employed for the alleviation of narcotic poisoning may vary depending upon the severity of the condition being treated. However, in general, satisfactory results are obtained when the active compound is administered i.v. *pro re nada* at a dosage of from about 0.05 mg./kg. to about 75 mg./kg. of animal body weight. For most large animals, the dosage is from about 3.5 to about 350 mg. i.v.

Example 1

1Sulfamoylhexamethylenimine

A mixture of 10 g. (0.1 mole) of hexamethylenimine, 11.5 g. (0.12 mole) of sulfamide and 200 ml. of pyridine is stirred and refluxed in an apparatus attached to a bubble detector. The refluxing is continued until the gas ($NH_3$) evolution, as detected by the bubble detector, has stopped. The mixture is allowed to cool to room temperature and then filtered to remove any polymeric sulfamides that have formed. The filtrate is concentrated in vacuo and the residue crystallized from ethanol:water (1:1) to give 1-sulfamoylhexamethylenimine; m.p. 70°–71° C.

Example 2

Sterile Solution for Injection

The following ingredients (parts shown) are dissolved in water for injection: 1-sulfamoylhexamethylenimine (10); sodium alginate (0.5); buffer system (as desired); lecithin (0.5); sodium chloride (as desired); water for injection (to desired volume). The resulting solution is filtered through an appropriate medium to render a clear solution. The solution is then autoclaved to render it sterile.

We claim:

1. An analeptically effective sterile liquid injectable pharmaceutical composition comprising as an active ingredient thereof, 1-sulfamoylhexamethylenimine and a pharmaceutically acceptable liquid carrier therefore, said compound being present in said composition in the amount sufficient to provide a dosage of from about 3.5 mg. to about 350 mg. of said compound.

2. The pharmaceutical composition of claim 1 which is an injectable solution, suspension, dispersion or emulsion containing about 0.35 percent to 5.0 percent of 1-sulfamoylhexamethylenimine.

3. A method for treating narcotic poisoning which comprises administering to a mammal by injection an analeptically effective amount of the compound named in claim 1.

4. A method for treating narcotic poisoning which comprises administering to a mammal by injection about 3.5 to 350 mg. of the compound named in claim 1.